(12) United States Patent
Abushattal et al.

(10) Patent No.: US 12,556,237 B2
(45) Date of Patent: Feb. 17, 2026

(54) SECURE NOMA METHOD BASED ON PHYSICAL LAYER SECURITY

(71) Applicant: ISTANBUL MEDIPOL UNIVERSITESI, Istanbul (AR)

(72) Inventors: Abdelrahman Abushattal, Istanbul (TR); Hüseyin Arslan, Istanbul (TR)

( * ) Notice: Subject to any disclaimer, the term of this patent is extended or adjusted under 35 U.S.C. 154(b) by 313 days.

(21) Appl. No.: 18/259,753

(22) PCT Filed: Dec. 26, 2021

(86) PCT No.: PCT/TR2021/051509
§ 371 (c)(1),
(2) Date: Jun. 28, 2023

(87) PCT Pub. No.: WO2022/146365
PCT Pub. Date: Jul. 7, 2022

(65) Prior Publication Data
US 2024/0063849 A1    Feb. 22, 2024

(30) Foreign Application Priority Data
Dec. 31, 2020   (TC) ................ 2020/22629

(51) Int. Cl.
*H04B 7/0426* (2017.01)
*H04B 7/06* (2006.01)
*H04K 1/00* (2006.01)

(52) U.S. Cl.
CPC ......... *H04B 7/0426* (2013.01); *H04B 7/0617* (2013.01); *H04K 1/006* (2013.01)

(58) Field of Classification Search
CPC ..... H04B 7/0426; H04B 7/0617; H04K 1/006
(Continued)

(56) References Cited

U.S. PATENT DOCUMENTS

| 10,651,961 B2 | 5/2020 | Sun et al. |
| 2019/0132165 A1* | 5/2019 | Shieh .................. H04L 27/2691 |

(Continued)

FOREIGN PATENT DOCUMENTS

KR    20200031547 A    3/2020

OTHER PUBLICATIONS

International Search Report for corresponding PCT/TR2021/051509 dated Apr. 14, 2022.
(Continued)

*Primary Examiner* — Don N Vo
(74) *Attorney, Agent, or Firm* — EGBERT, MCDANIEL & SWARTZ, PLLC

(57) ABSTRACT

Disclosed is a secure scheme that incorporates both internal and external eavesdroppers to secure all users' links in the downlink PD-NOMA. In particular, the proposed scheme implies that the BS induces a phase shift in each user's symbol based on its corresponding instantaneous channel phase. The phase shift of each user is restricted such that the original symbol is moved to the location of another symbol in the constellation diagram. Therefore, as each user is aware of its instantaneous channel phase only, it will be able to recover the actual phase of its corresponding symbol. Thus, the proposed scheme does not only protect the data against eavesdroppers, but it also guarantees confidentiality and privacy against all other users.

5 Claims, 1 Drawing Sheet

(58) Field of Classification Search
USPC .......................................................... 455/522
See application file for complete search history.

(56) References Cited

U.S. PATENT DOCUMENTS

| | | | |
|---|---|---|---|
| 2019/0260418 A1* | 8/2019 | Park | H04J 13/16 |
| 2019/0296870 A1* | 9/2019 | Seo | H04L 1/1896 |
| 2021/0175995 A1 | 6/2021 | Ju | |
| 2021/0211171 A1* | 7/2021 | Meng | H04L 1/0071 |
| 2022/0271902 A1* | 8/2022 | Sokun | H04B 7/0413 |

OTHER PUBLICATIONS

Written Opinion of the International Searching Authority for corresponding PCT/TR2021/051509 dated Apr. 14, 2022.

Hamamreh et. al, "Classifications and Applications of Physical Layer Security Techniques for Confidentiality: A Comprehensive Survey," in IEEE Communications Surveys & Tutorials, vol. 21, No. 2, pp. 1773-1828, Second quarter 2019, doi: 10.1109/COMST.2018.2878035.

Abushattal et. al, "A Secure Downlink NOMA Scheme Against Unknown Internal Eavesdroppers," in IEEE Wireless Communications Letters, vol. 10, No. 6, pp. 1281-1285, Jun. 2021, doi: 10.1109/LWC.2021.3064234.

* cited by examiner

SECURE NOMA METHOD BASED ON PHYSICAL LAYER SECURITY

TECHNICAL FIELD

The present invention is a secure Non-Orthogonal Multiple Access (NOMA) method based on physical layer security concepts.

More particularly, the proposed method exploits the random and independent channel characteristics to induce a different phase shift in each user's symbol. Based on the assumption that the instantaneous channel phase between a user and the base station is available only at both ends, other users will not be able to decode the right symbol. The proposed scheme does not impact the performance at users' ends, and at the same time, can guarantee data confidentiality of each user against both internal and external eavesdropping.

BACKGROUND

NOMA has gained significant attention for 5G and beyond wireless systems for its desired properties. Among the different NOMA schemes, Power Domain NOMA (PD-NOMA) has recently received high attention due to its improved connectivity and simple implementation. It suffers from critical security risks. In particular, because all signals are broadcasted together over the same resources, there is a risk that an eavesdropper intercepts the transmission and gains access to user signals. Thus, Physical Layer Security (PLS) techniques have emerged as viable solutions for the shortcomings of conventional cryptography [7, 8, 9]. PLS exploits the diverse properties of the wireless fading channel (random channel fading, interference, noise, etc.) in such a way that the legitimate user can decode their data while the eavesdropper (Eve) is unable to decode any intercepted data. Consequently, PLS holds great potential in addressing security concerns present in NOMA and thus has gained significant research activity in recent years.

In NOMA, multiple users exploit the communication channel at the same time with different power levels this makes the information exchange between the communication entity vulnerable to eavesdropping which considers as one of the critical security problems in a communication system. An eavesdropper within a NOMA system can fall into one of two categories; external (that is not one of the legitimate users being served by the base station (BS)) or internal (which is one of the served users) [1]. Enhancing security level against potential internal eavesdroppers in PD-NOMA has been reported as a serious challenge. This is because the employed successive interference cancellation (SIC) detection technique in PD-NOMA dictates that a user should decode the signals of the users that have higher power levels, which makes transmitted signals vulnerable to eavesdropping [10].

The external Eve has been considered in the literature where different security mechanisms have been proposed to secure normal NOMA users from being eavesdropped based on different setups and scenarios. For example, artificial noise has been adopted in [2, 3] to degrade the performance at Eve, while the protected zone concept is utilized in [4, 5] where no Eve can reside in this zone. The shape and location of the protected zone are optimized for downlink mmWave-based NOMA systems in [6, 7] and uplink multi-antenna NOMA systems in [8]. In [9], transmit antenna selection is used to secure the data for two NOMA users against an external Eve. In another approach, the beamforming and the artificial noise are combined to degrade the reception at the external Eve in [10, 11], while optimizing beamforming and power allocation are considered in [12, 13, 14].

However, all of the above-mentioned works aim at degrading the received signal at Eve, which makes them invalid for combating internal eavesdroppers. besides, these methods could not face challenging requirements in terms of latency, spectral efficiency, connection density, data rate, energy efficiency, computational and hardware complexity. Examples of systems that face these challenges are the Internet of Things (IoT) system, ultra-reliable low-latency communication (URLLC), and massive machine-type communication (mMTC). As mentioned earlier, internal Eve is one of the served users, and hence, the employed security mechanism should not affect its data reception while it should prevent Eve from revealing the others' data.

The internal Eve, which is the main focus of this work, has been considered in only a few works [15, 16, 17, 18, 19]. In [17], users are distributed among clusters, and a zero-forcing beamforming scheme is presented to minimize mutual interference and information leakage. However, the case that the eavesdropper is the far user is considered simple as compared to the case when the eavesdropper is the near user.

Moreover, the eavesdropper is assumed to be identified at the BS, which should facilitate the action against it. Unlike [15, 16, 17], the authors of [18] combine both artificial noises aided beamforming and power allocation to mitigate the impact of the presence of an internal near eavesdropper and an external eavesdropper. Although it works efficiently against both types of eavesdroppers (internal and external), it requires that both are identified at the BS and their instantaneous channel gains are known as well. Thus, if a user is incorrectly identified as an eavesdropper, its performance will be degraded.

Recently, in [19], the directional modulation is exploited to protect the data of a far trusted user from being intercepted by an internal near eavesdropper. Specifically, directional modulation implies hiding the symbols transmitted to the trusted (far) user by representing them in a way so that the eavesdropper receives different lower-order symbols. Although it can efficiently protect the far user's data, it suffers from several limitations. First, it cannot be implemented for a system of more than to users, or more than a single eavesdropper. Second, the eavesdropper must be identified and known at the BS. Third, there is no guarantee to reach the optimal vector of the directional modulation.

The application numbered U.S. Ser. No. 10/651,961 describes techniques for wireless communication. A first method includes receiving downlink control information for first user equipment (UE) based at least in part on a group identifier associated with a NOMA group including the first UE and at least a second UE; and receiving a set of NOMA downlink transmissions at the first UE based at least in part on the downlink control information for the first UE. A second method includes receiving downlink control information for a first UE, the downlink control information for the first UE including an indication of at least a second UE; receiving downlink control information for the second UE based at least in part on the indication of at least the second UE; receiving a set of NOMA downlink transmissions at the first UE based at least in part on the downlink control information for the first UE and the downlink control information for the second UE. However, the application cannot guarantee data confidentiality of each user against both internal and external eavesdropping.

SUMMARY

To secure all users' links in the downlink PD-NOMA, this invention proposes a novel secure scheme that incorporates both internal and external eavesdroppers. In particular, the proposed scheme implies that the BS induces a phase shift in each user's symbol based on its corresponding instantaneous channel phase. The phase shift of each user is restricted such that the original symbol is moved to the location of another symbol in the constellation diagram. Therefore, as each user is aware of its instantaneous channel phase only, it will be able to recover the actual phase of its corresponding symbol. Thus, the proposed scheme does not only protect the data against eavesdroppers, but it also guarantees confidentiality and privacy against all other users. The only basic assumption in the proposed scheme is the availability of the full CSI at the BS It is worth highlighting that such an assumption is not an additional requirement since the CSI is already required at the BS for many other tasks.

The proposed algorithm can provide security against both internal and external eavesdropping without additional time or power resource consumption compare to conventional secure PD-NOMA schemes. Thus, the proposed method is more suitable for the networks that face challenging requirements in terms of latency, spectral efficiency, connection density, data rate, and energy efficiency like the Internet of Things (IoT) devices, massive machine type communication (mMTC), ultra-reliable low latency communication (ULLRC), remote surgery, and healthcare application.

The advantages of the proposed secure scheme can be summarized as follows:
- The proposed scheme can work efficiently against internal and external eavesdroppers regardless of their locations, channel orders, and SNRs.
- The proposed scheme can work efficiently for any number of eavesdroppers present in the system.
- The proposed scheme does not induce any additional time or resource consumption concerning the conventional PD-NOMA system.
- The proposed scheme does not affect the error performance of other legitimate users.
- As the eavesdropper is an internal user, the proposed scheme allows the eavesdropper to get its data only and protects the others' data from being eavesdropped on.
- The BS does need to identify the eavesdropper, where the proposed scheme assumes that the eavesdropper is unknown at the BS.
- Relying on the channel phase to precode the signals improves the resilience of the proposed scheme. This is because the channel phase is fairly hard to be estimated or predicted by a third party as the channel phase is distant-independent.

DETAILED DESCRIPTION

In this invention, a novel secure Non-Orthogonal Multiple Access (NOMA) scheme based on physical layer security concepts is proposed. The proposed scheme exploits the random and independent channel characteristics to induce a different phase shift in each users symbol. Based on the assumption that the instantaneous channel phase between a user and the base station is available only at both ends, other users will not be able to decode the right symbol. The proposed scheme does not impact the performance at users' ends, and at the same time, can guarantee data confidentiality of each user against both internal and external eavesdropping.

In the first scenario, a secure downlink NOMA system against an unknown internal eavesdropper is proposed. In the BS, each user signal is modulated to be delivered.

Then, different power levels for each user is assigned based on its channel conditions, where the best user (usually the nearest) is allocated the lowest power level, and the highest power level is allocated to the worst user (usually the farthest). Denoting the power coefficient of user n by $\rho_n$, the allocated power coefficients should satisfy:

$$\sum_{n=1}^{N} \rho_n = 1, \text{ and } \rho_1 < \rho_2 < \ldots < \rho_n. \quad (1)$$

Based on the proposed scheme, the BS induces a phase shift on each symbol before merging the transmitted symbols. Specifically, the BS will exploit its knowledge of the CSI of all users in order to extract a specific phase shift for each particular user that will be used to rotate its corresponding symbol. However, the challenge in NOMA systems is that the BER at a user mainly relies on its ability to correctly detect the other users' symbols. As such, the induced phase shift on a user should be carefully selected not to affect other users' performance.

Being a complex value, block fading channel $h_n$ can be expressed as $h_n = j_n e^{i\theta_n}$, where $j_n$ and $\theta_n$ represent the magnitude and the phase of $h_n$, respectively, and i is the imaginary unit. Accordingly, the phase shift on the symbol of user n, denoted by $\phi_n$, is given as follows:

$$\phi_n = \left(\left\lfloor \frac{\theta_n}{2\pi/M} \right\rfloor + 1\right) \times \frac{2\pi}{M}. \quad (2)$$

Figure 1:
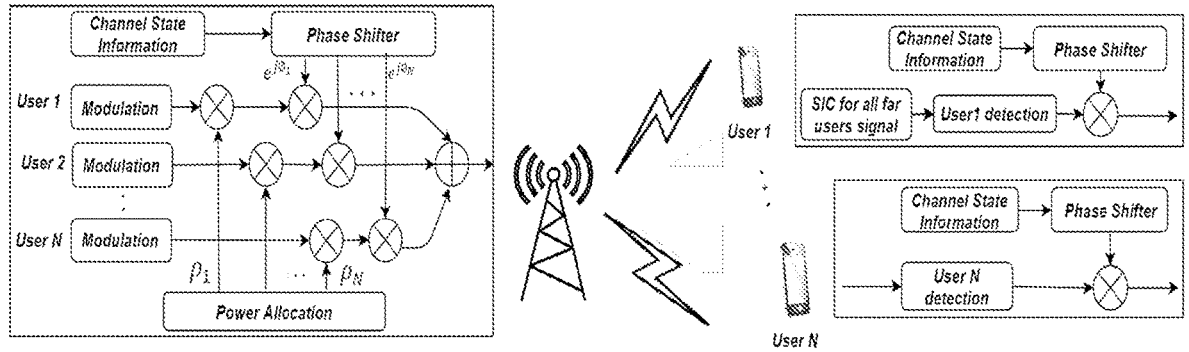
FIG. 1 shows the flowchart of the secure downlink NOMA method against an unknown internal eavesdropper.

It should be noted the phase shift will rotate the corresponding symbol by a multiple of $2\pi/M$, and hence, it will appear as another symbol on the constellation diagram. Thus, users (other than the intended user) will detect it as one of the candidate symbols (constellation points), and only the intended user (that is aware of $\phi_n$) can recover the original phase of the symbol. FIG. 1 illustrates the proposed secure scheme for PD-NOMA systems.

Following the proposed scheme, the received signal at the user n is now given by $$y_n = \sqrt{P} h_n \left( \sum_{k=1}^{N} \sqrt{\rho_k} e^{-i\phi_k S_k} \right) + w_n. \quad (3)$$

where $w_n$ is denote the additive white Gaussian noise (AWGN) with zero mean and $\sigma^2$ variance $w_n$, $\sim N(0, \sigma^2)$ at the $n^{th}$ user's. Besides, all links are modeled by large-scale (path-loss) and small-scale fading $$h_n = d_n^{-\frac{n}{2}} f_n$$

where $f_n$ is modeled by the Rayleigh fading channel gain $f_n \sim N(0, \sigma^2)$. And $d_n$ is the separation distance between the transmitter and the receiver n, and n is the path loss exponent.

Accordingly, the SIC detection to accommodate the induced phase as:

$$\hat{s}_n = \arg\min_{l=1:M} \left| y_n - \sqrt{P} h_n \left( \sum_{k=n+1}^{N} \sqrt{\rho_k} \hat{s}_k \right) - \sqrt{P\rho_n} h_n e^{-i\phi_n} s_l \right| \quad (4)$$

Each user performs SIC. SIC implies that each user performs an iterative maximum likelihood detection. Specifically, given the power levels order, user n detects the other users' symbols starting with the first user (i.e., user N) until reaching its symbol. At each iteration, the detected symbol is subtracted from the received signal, and the result is passed to the next iteration. This process allows a user to detect only the symbols of the users that have higher power coefficients than its coefficient. In other words, the user N signal is detected and subtracted from the received signal ($y_n$) to find the user (N−1) signal and these procedures are repeated until the indented user detects his signal.

In the second scenario, a secure uplink mMTC-NOMA scheme against an external eavesdropper is defined. The mMTC refers to provide a massive connection between a large number of devices that transmit a small amount of data traffic like IoT applications, healthcare sensors, smart homes, etc. In up-link NOMA-based mMTC networks, multiple MTC devices (MTCDs) utilized the subchannel for transmission at the same time but with different power allocation. And each user allocated power due to their channel condition. Thus, the MTCD with the worst channel is allocated more power compare with the MTCD with better channel conditions. By assuming that the allocated power coefficients $\rho_1 > \rho_2 > \ldots > \rho_n$ due to the channel gain condition $|h_1|^2 < |h_n|^2 < \ldots < |h_N|^2$.

Figure 2:
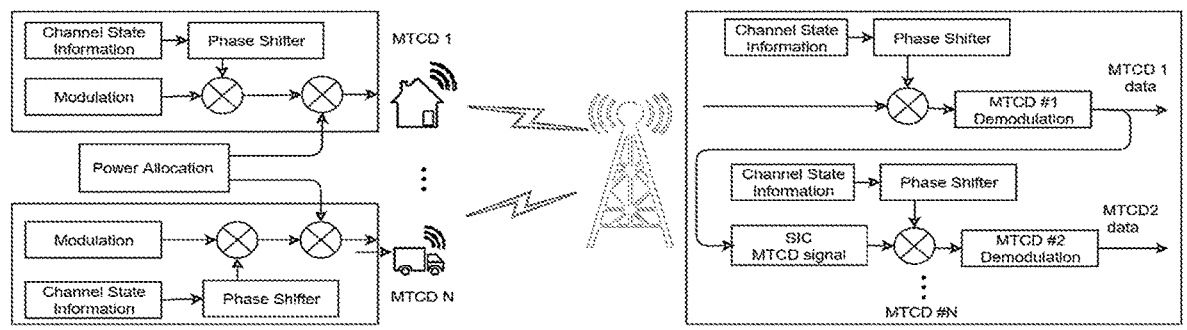
FIG. 2 shows the flowchart of the secure uplink mMTC-NOMA method against the external eavesdropper.

As shown in FIG. 2, each MTCD will shift own original phase of the symbol by the amount of phase determined in Eq. (2) then transmit the signal to the BS. the received signals at legitimate BS and Eve-BS will be:

$$y_d = \sum_{k=1}^{N} h_n \sqrt{\rho_n P_n} s_n e^{-i\phi_k} + w_{d,n} \quad (5)$$

$$y_e = \sum_{k=1}^{N} g_n \sqrt{\rho P_n} s_n e^{-i\phi_k} + w_{e,n} \quad (6)$$

where $w_{d,n}$ and $w_{e,n}$ are denote the additive white Gaussian noise (AWGN) with zero mean and $\sigma^2$ variance $w_{d,n}, w_{e,n} \sim N(0, \sigma^2)$ between user n, legitimate BS, and Eve-BS, respectively. Besides, all links are modeled by large-scale (path-loss) and small-scale fading in such a way that $h_n$ and $$g_n = d_n^{-\frac{n}{2}} f_n$$

where $f_n$ is modeled by the Rayleigh fading channel gain $f_n \sim N(0, \sigma^2)$. And do is the separation distance between the MTCD and the BS, and n is the path loss exponent.

Both legitimate BS and external eavesdropper exploit the SIC technology to decode the superposed received signals. SIC implies an iterative procedure where a BS first detects the signal of the strongest MTCD. Then subtracts this signal from the received signal until decode all MTCD receiver signals. At each iteration, the BS considers all other strong MTCD received signals as interference while weak MTCD received signals as noise. Since the CSI used to determine the phase shift ($\phi_n$) and secure the information is available only to the MTCDs and legitimate BS. The external eavesdropper will evaluate differently phase value $$\psi_n = \left( \left\lfloor \frac{\Omega_n}{2\pi/M} \right\rfloor + 1 \right) \times \frac{2\pi}{M}$$

wherein $\Omega_n$, the phase of $g_n$. Thus, the legitimate BS will correctly detect the information for each user while external eavesdropper will not.

REFERENCES

[1] N. Zhao, D. Li, M. Liu, Y. Cao, Y. Chen, Z. Ding, and X. Wang, "Secure transmission via joint precoding optimization for downlink MISO NOMA," *IEEE Trans. Veh. Tech.*, vol. 68, no. 8, pp. 7603-7615, 2019.

[2] H. Bao, C. Zhang, L. Wu, and M. Li, "Design of physical layer secure transmission scheme based on SWIPT NOMA systems," in *IEEE ICCT*, 2017, pp. 6-9.

[3] B. Chen, Y. Chen, Y. Chen, Y. Cao, Z. Ding, N. Zhao, and X. Wang, "Secure primary transmission assisted by a secondary full-duplex NOMA relay," *IEEE Transactions on Vehicular Technology*, vol. 68, no. 7, pp. 7214-7219, 2019.

[4] Z. Qin, Y. Liu, Z. Ding, Y. Gao, and M. Elkashlan, "Physical layer security for 5G non-orthogonal multiple access in large-scale networks," in *IEEE ICC*, 2016, pp. 1-6.

[5] N. Rupasinghe, Y. Yapici, I. Guvenc, H. Dai, and A. Bhuyan, "Enhancing physical layer security for NOMA transmission in mmWave drone networks," in 2018 *52nd Asilomar Conference on Signals, Systems, and Computers*. IEEE, 2018, pp. 729-733.

[6] Y. Yapici, I. Guvenc, H. Dai, A. Bhuyan, and N. Rupasinghe, "Physical layer security for mmwave drone links with noma."

[7] Y. Yapici, N. Rupasinghe, I. Guvenc, H. Dai, and A. Bhuyan, \Physical layer security for noma transmission in mmwave drone networks," *arXiv preprint arXiv: 2001.04863*, 2020.

[8] G. Gomez, F. J. Martin-Vega, F. Javier Lopez-Martinez, Y. Liu, and M. Elkashlan, "Physical layer security in uplink noma multi-antenna systems with randomly distributed eavesdroppers," *IEEE Access*, vol. 7, pp. 70422-70435, 2019.

[9] H. Lei, J. Zhang, K.-H. Park, P. Xu, I. S. Ansari, G. Pan, B. Alomair, and M.-S. Alouini, "On secure NOMA systems with transmit antenna selection schemes," *IEEE Access*, vol. 5, pp. 17450-17464, 2017.

[10] Y. Liu, Z. Qin, M. Elkashlan, Y. Gao, and L. Hanzo, "Enhancing the physical layer security of nonorthogonal multiple access in large-scale networks," *IEEE Trans. Wireless Comm.*, vol. 16, no. 3, pp. 1656-1672, 2017.

[11] L. Lv, Z. Ding, Q. Ni, and J. Chen, "Secure MISO-NOMA transmission with articial noise," *IEEE Trans. Veh. Tech.*, vol. 67, no. 7, pp. 6700-6705, 2018.

[12] Y. Li, M. Jiang, Q. Zhang, Q. Li, and J. Qin, "Secure beamforming in downlink MISO nonorthogonal multiple access systems," *IEEE Trans. Veh. Tech.*, vol. 66, no. 8, pp. 7563-7567, 2017.

[13] B. M. ElHalawany and K. Wu, "Physical-layer security of NOMA systems under untrusted users," in 2018 *IEEE GLOBECOM*, 2018, pp. 1-6.

[14] Y. Cao, N. Zhao, Y. Chen, M. Jin, Z. Ding, Y. Li, and F. R. Yu, "Secure transmission via beamforming optimization for NOMA networks," *IEEE Wireless Comm.*, 2019.

[15] B. M. ElHalawany and K. Wu, "Physical-layer security of noma systems under untrusted users," in 2018 *IEEE Global Communications Conference (GLOBECOM)*, 2018, pp. 1-6.

[16] K. Cao, B. Wang, H. Ding, T. Li, and F. Gong, "Optimal relay selection for secure noma systems under untrusted users," *IEEE Transactions on Vehicular Technology*, vol. 69, no. 2, pp. 1942-1955, 2020.

[17] Y. Li, M. Jiang, Q. Zhang, Q. Li, and J. Qin, "Secure beamforming in downlink miso nonorthogonal multiple access systems," *IEEE Transactions on Vehicular Technology*, vol. 66, no. 8, pp. 7563-7567, 2017.

[18] K. Cao, B. Wang, H. Ding, T. Li, J. Tian, and F. Gong, "Secure transmission designs for noma systems against internal and external eavesdropping," *IEEE Transactions on Information Forensics and Security*, vol. 15, pp. 2930-2943, 2020.

[19] R. M. Christopher and D. K. Borah, "Physical layer security for weak user in miso noma using directional modulation (nomad)," *IEEE Communications Letters*, vol. 24, no. 5, pp. 956-960, 2020.

The invention claimed is:

1. A secure downlink non-orthogonal multiple access (NOMA) method for use against an unknown internal eavesdropper, the secure downlink NOMA method comprising:
    inducing a phase shift on each symbol;
    merging and sending a superposed signal to a user from a base station;
    performing successive interference cancellation for each user by detecting a symbol of other users starting with a first user until reaching a symbol therefor by subtracting the detected symbol from a received symbol at each iteration and carrying a resulting signal to a next iteration; and
    performing another phase shift to detect a confidential signal.

2. The secure downlink NOMA method of claim 1, wherein the base station extracts a specific phase shift for each user in order to be used to rotate a corresponding symbol thereof.

3. The secure downlink NOMA method of claim 1, wherein the phase shift on each symbol of each user is in accordance with $$\phi_n = \left(\left[\frac{\theta_n}{2\pi/M}\right]+1\right)\times\frac{2\pi}{M},$$

wherein $\theta_n$ is a phase of $h_n$ and M is a modulation level.

4. A secure uplink massive machine communication NOMA method for use against an external eavesdropper, the secure uplink massive machine communication NOMA method comprising:
    modulating a symbol of each user for delivery to a base station;
    shifting the symbol by a phase value;
    transmitting signals of the user in accordance with allocated power to the base station;
    receiving signals from all users simultaneously at the base station;
    detecting a signal of a strongest user and applying another phase shift in order to demodulate the signal of the strongest user;
    applying iterative successive interference cancellation to detect signals of remaining users; and
    applying a further phase shift until all signals of the users has been detected.

5. The secure uplink massive machine communication NOMA method of claim 4, wherein the phase shift on each symbol of each user is in accordance with $$\phi_n = \left(\left[\frac{\theta_n}{2\pi/M}\right]+1\right)\times\frac{2\pi}{M},$$

wherein $\theta_n$ is a phase of $h_n$ and M is a modulation level.

* * * * *